March 31, 1959     P. HORN     2,880,030
APPARATUS FOR HANDLING MATERIALS
Filed June 22, 1956     2 Sheets-Sheet 1

March 31, 1959 P. HORN 2,880,030
APPARATUS FOR HANDLING MATERIALS
Filed June 22, 1956 2 Sheets-Sheet 2

United States Patent Office 2,880,030
Patented Mar. 31, 1959

2,880,030

APPARATUS FOR HANDLING MATERIALS

Peter Horn, St. Louis County, Mo., assignor to P. Ballantine & Sons, Newark, N.J., a corporation of New Jersey Application June 22, 1956, Serial No. 593,218

5 Claims. (Cl. 294—65)

The present invention relates to the handling of materials and more particularly to the loading and unloading of cartons, bags, blocks and other units onto and from portable platforms or pallets.

In Wahl et al. Patent 2,716,497 granted August 30, 1955, there is described a machine for palletizing and depalletizing tiers of units. As described in this patent, such a machine may comprise a hollow suction head having a rigid upper portion and a flexible curtain, skirt or apron-like member depending from the upper portions adjacent the periphery thereof. This skirt or apron-like member encircles the units forming a tier and engages in substantially air-tight manner the sides of the units forming the periphery of a tier. The head is connected to a source of suction so that when suction is applied, the skirt or apron-like member will engage the units in such air-tight manner. The head, with the tier of units depending therefrom, may then be moved to deposit the tier in a desired place, e.g., on a pallet.

The present invention is concerned with providing an improvement in the suction head of the aforementioned Wahl et al. patent and is particularly directed to providing an improved seal when lifting objects with irregular or rounded edges such as bags and the like.

Accordingly, it has been an object of the invention to provide a novel and improved suction head for grasping a tier of objects.

Another object of the invention has been to provide a novel and improved suction head which provides a dependable seal when lifting objects with irregular or rounded edges and which minimizes the suction requirements in such service.

Still another object of the invention has been the provision of a novel and improved suction head which can conveniently accommodate tiers of units in a pattern having an opening therein.

Other and further objects, features and advantages of the invention will appear more fully from the following description.

In accordance with the invention, in apparatus for transferring a plurality of units in groups formed of individual units in patterned relation forming a tier, there is provided a hollow suction head for gripping and transferring a tier comprising a rigid upper portion having a solid top member and a flexible skirt-like member depending from said upper portion adjacent to the periphery thereof and adapted to encircle the units forming a tier and to engage in substantially air-tight manner the sides of the units forming the periphery of a tier. A plurality of resilient pads depend from said upper portion inwardly of said skirt-like member and extend in a line outlining the peripheral edge of a tier of units, said pads being spaced from each other and being adapted to engage the upper surfaces of the units forming a tier adjacent the peripheral edge of the tier. The top member is provided with an aperture for communication with a source of suction thereby to create a desired suction within said head whereby said skirt-like member engages said units in said substantially air-tight manner.

The invention will now be described in greater detail with reference to the appended drawings, in which.

Figure 1:
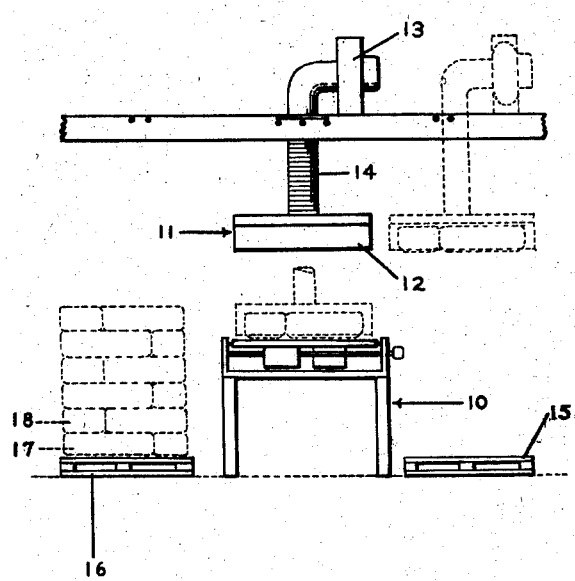
Fig. 1 is a schematic elevational view illustrating the palletizing operation.

Referring now to the drawings, and more particularly to Fig. 1, there is shown an accumulator table 10 on which successive tiers of units to be palletized may be formed. Suitable mechanisms for forming such tiers are described, for example, in the aforementioned Wahl et al. patent. When a complete tier has been formed on the front of the accumulator table 10, a suction head 11 is lowered to the position shown in dotted lines over the accumulator table and in which a depending sealing device or member 12 encircles the periphery of the tier. Air is then evacuated from the interior to the suction head by means of a blower 13, which communicates with the suction head through a flexible tube 14. When the suction head 11 is raised, the differential in air pressure acting on the units forming the tier causes the latter to travel with the suction head, which deposits the tier on one of the pallets 15 and 16. Additional tiers may be deposited one on top of the other until a complete pallet load is achieved, at which time loading will be transferred to the other pallet. If desired, the pattern of units forming a tier may be varied to provide an interlocking stack. Thus, in Fig. 1 tiers 17 and 18 have different patterns. When a tier has reached the desired position on or over the appropriate pallet, the suction is released to deposit the tier and the head is returned to a position over the accumulator table 10 preparatory to picking up another load.

In the de-palletizing or unloading operation, a loaded pallet is unloaded by the suction head 11, which grasps the top tier loaded on a pallet, raises it, moves it to a position over the front of the accumulator table 10, and lowers it onto the accumulator table. Suction is then released and the suction head 11 returns to pick up the next tier. In the meantime the deposited tier is moved to the rear of the table and rows are discharged, one by one, onto an outgoing conveyor section.

Figure 2:
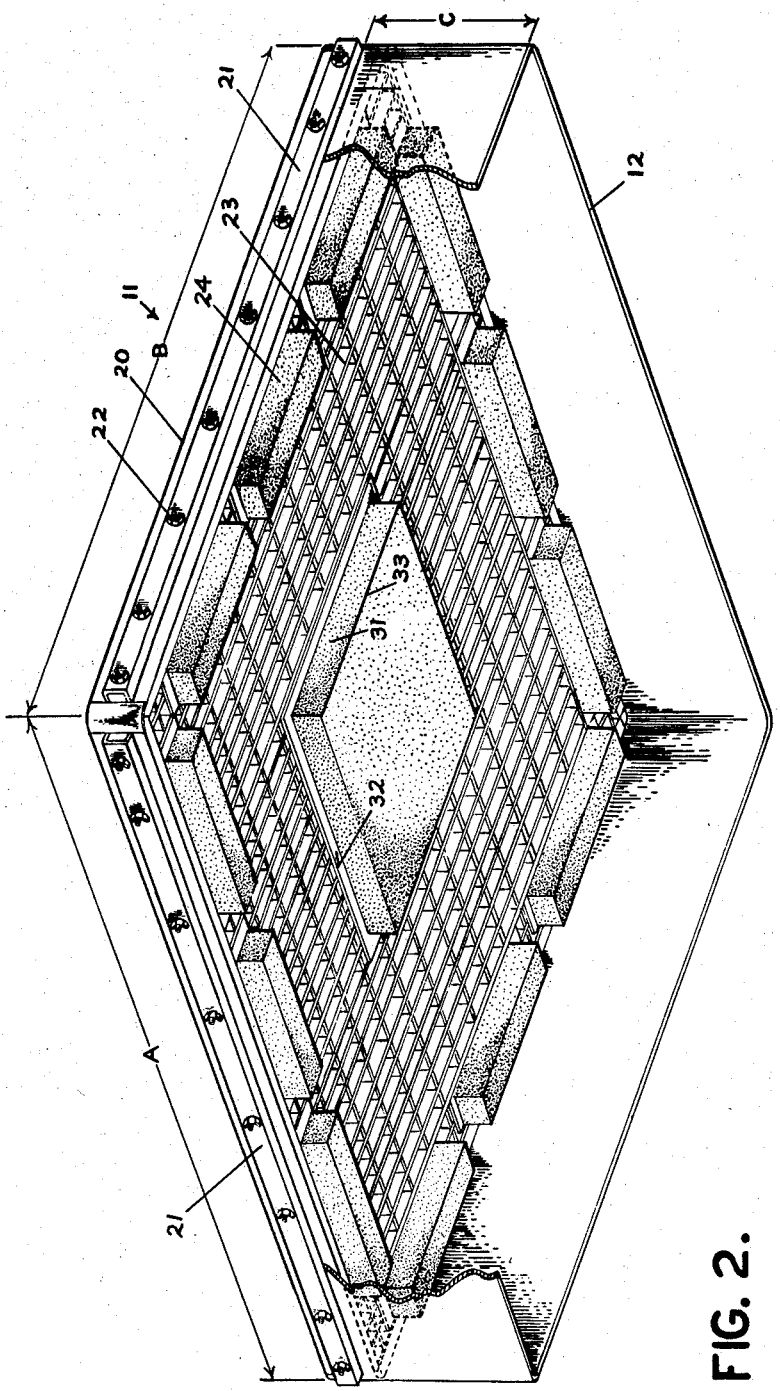
Fig. 2 is a pictorial view of a suction head constructed in accordance with the invention, a portion of the curtain being broken away to illustrate more clearly the bottom construction.

Turning now to Fig. 2, the suction head 11 is provided with a solid top portion 20 which has an aperture (not shown) in the top thereof for communicating with a source of suction. This might conveniently be an aperture for admitting the end of the tube 14. Around the periphery of the suction head and depending therefrom there is provided a flexible curtain, apron or skirt-like member 12. The upper end of the member 12 is affixed to the outside of the top 20 by means of channel members 21, which press the member 12 against the side of the top 20 and are held in place by bolts 22, which extend through suitable holes provided in the top 20 and the channel members 21.

The suction head 11 will generally be rectangular in shape, although other shapes could be provided. The dimensions "$a$" and "$b$" will be selected so that the head is somewhat larger than the tier to be accommodated. The depending member 12, whose height is designated by the letter "$c$" should extend down far enough to engage a portion of the side surfaces of the periphery of a tier of units. The amount of the side surfaces which need to be engaged by the member 12 will depend upon the character of these surfaces and the degree of sealing to be achieved. In general, the member 12 should be long enough to provide a vertical seal along the peripheral sides of a tier and still be able to extend inwardly so as to accommodate tiers having smaller areas. When the tiers are made up of relatively tall units, e.g., cases of quart bottles, the member 12 will extend downwardly only a short distance along the vertical surfaces of the units. Where the units are relatively short, for example, bags of sugar, the member 12 will be longer than the units and the bottom of the member 12 may extend below these units.

In order to define a suction chamber within the head 11, a grating of metal bars 23 is provided. This grating depends from the top member 20. Any suitable member provided with apertures for the free passage of air therethrough might be provided in place of the grating of metal bars 23. For example, a screen or a perforated plate might be provided. The upper end of the suction chamber defined by the grating 23 is formed by the top member 20. The bottom end of this chamber is formed by the tops of the units forming a tier.

Figure 3:
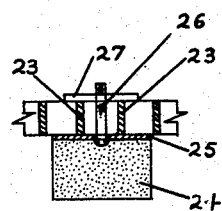
Figs. 3 and 4 are fragmentary views, partly in crosssection, illustrating a suitable mode of attachment of the flexible pads of Fig. 2 to the suction head.
Figure 4:
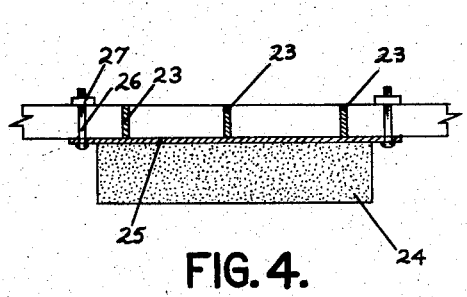

Along the bottom of the suction head around the periphery thereof but within the member 12 there is provided a series of resilient blocks or pads 24. The blocks 24, which may be considered as auxiliary sealing elements, are spaced from each other and extend in a line outlining the periphery of a tier of units to be transferred. The blocks 24 may conveniently be made of sponge rubber or some similar resilient material which will accommodate itself to the rounded or irregular profile edge of an individual bag or similar unit to be grasped. As is best shown in Figs. 3 and 4, the blocks 24 may be cemented to plates 25. The plates 25 may be affixed in place against the bottom of the grating 23 by means of machine screws 26. The machine screws 26 act in threaded holes provided in plates 27 that rest on the upper surfaces of the metal gratings. The screws 26 can easily be loosened to permit moving the blocks 24 to any desired location for accommodating different sized tiers.

In lifting certain types of loads, and particularly tiers of heavy bags, it has been found that the curtain will in some cases draw in over the rounded surfaces of the bags when suction is applied. In such case, while the curtain forms a seal, it is a seal which may be broken when an attempt is made to lift the load. In accordance with the invention, this difficulty is eliminated by provision of the blocks or pads 24 located around the outer edge of the load in spaced locations. These blocks or pads, which are preferably rectangular in shape, are located around the outer edge of the contact or bottom side of the lifting head 11 so as to bear directly against the rounded or irregular profile edge of an individual layer of bags or similar units. Spacing should be maintained between adjacent blocks in order to permit air to enter the suction chamber when the suction is turned on, thus drawing the curtain firmly into sealing engagement with the peripheral sides of the units forming a tier. The blocks should, however, be spaced sufficiently close together so that the curtain will not be drawn in onto the tops of the units. While the spacing between the blocks and the lengths of the blocks may be varied widely to accommodate particular situations, it has been found convenient to provide a space between the blocks of about 2 to 4 inches.

In operation, when the blower valve is opened so that suction is applied to the suction chamber, which will occur after the blocks or pads 24 are in contact with the bags or other units, air is drawn at a high velocity through the open passages between the blocks or pads 24. This rapid surge of air immediately draws the curtain 12 firmly around the peripheral sides of the load to form an effective seal, which is maintained throughout the lifting cycle. The spacing between the adjacent blocks or pads 24 must be restricted to a length insufficient for the curtain 12 to draw in over the load between the blocks. This minimum length will vary with the amount of suction applied. It will be evident that the blocks or pads 24 act to reduce the free passage of air to a minimum around the irregular and rounded edges of the bags during the interval in which the curtain 12 is being drawn into sealing engagement with the bags. For practical operations, the curtain 12 needs to be slightly larger than the load so as to drape around the load when the head is lowered. It is primarily this spacing between the curtain and the load which in some cases allows the curtain to be drawn in over the top of the load. The blocks or pads 24 overcome this difficulty.

Figure 5:
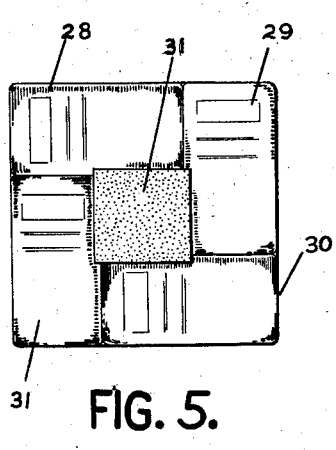
Fig. 5 is a plan view of a pinwheel pattern of bags.

In some cases it will be desirable to lift tiers in which there is a void between individual units. Such a tier, of the so-called pinwheel type, is shown in Fig. 5, in which bags 28, 29, 30 and 31 are arranged so as to have a space left in the middle. In accordance with a further aspect of the invention, air leakage through such a void is eliminated by the use of a block or pad 31 which depends from the grating 23 in a location such as to cover this void. The block 31 overlaps slightly the edges of the units along this void so as to provide an effective seal. The block 31 may be cemented to a metal plate 32 which may be affixed to the grating 23 in any convenient way, such as, for example, as shown in Figs. 3 and 4. The block or pad 31 may conveniently be made of sponge rubber. However, it has been found desirable to provide a layer of gum rubber or the like on the bottom of the sponge rubber in order to improve the sealing effect. Such a layer is shown in Fig. 2 at 33. The sponge rubber provides resilience to allow the pad to conform to an irregular shape or surface, while the layer of gum rubber provides an effective seal preventing air leakage through the pad itself. In operation, the initial seal will be made by the weight of the head itself pressing the pad 31 down against the tops of the units forming a tier. The pads 24 will be pressed down at the same time. The vacuum which is created within the suction chamber when the blower draws in the curtain will hold the load in suspension as the head is lifted. Should more than one open space occur in a particular tier pattern, more than one block or pad 31 will be used so as to seal all such open spaces. If a particular open space occurs in different places in different tiers, the pad 31 may be made large enough to accommodate both spaces.

While the invention has been described in connection with a specific embodiment thereof and in a specific use, various modifications thereof will occur to those skilled in the art without departing from the spirit and scope of the invention, as set forth in the appended claims.

What is claimed is:

1. In apparatus for transferring a plurality of units in groups formed of individual units in patterned relation forming a tier, a hollow suction head for gripping and transferring a tier comprising a hollow rigid upper portion having a solid top member and a spacing member affixed to and depending from said top member and having openings therein for the free passage of air therethrough, a substantially air-impermeable, flexible skirt-like member affixed to said upper portion in substantially air-tight manner and depending from said upper portion adjacent to the periphery thereof and adapted to encircle the units forming a tier and to engage in substantially air-tight manner the sides of the units forming the periphery of a tier, and a plurality of resilient pads affixed to and depending from said upper portion inwardly of said skirt-like member and extending in a line outlining the peripheral edge of a tier of units, said pads being spaced from each other and being adapted to engage the upper surfaces of the units forming a tier adjacent the peripheral edge of the tier, said top member having an aperture for communication with a source of suction thereby to create a desired suction within said head whereby said skirt-like member engages said units in said substantially air-tight manner.

2. In apparatus for transferring a plurality of units in groups formed of individual units in patterned relation forming a tier, a hollow suction head for gripping and transferring a tier comprising a hollow rigid upper portion having a solid top member and a spacing member affixed to and depending from said top member and having openings therein for the free passage of air therethrough, a substantially air-impermeable, flexible skirt-like member affixed to said upper portion in substantially air-tight manner and depending from said upper portion adjacent to the periphery thereof and adapted to encircle the units forming a tier and to engage in substantially air-tight manner the sides of the units forming the periphery of a tier, and a plurality of resilient pads affixed to and depending from said spacing member inwardly of said skirt-like member and extending in a line outlining the peripheral edge of a tier of units, said pads being adapted to engage the upper surfaces of the units forming a tier adjacent the peripheral edge of the tier and being spaced from each other by a distance sufficiently large to permit air drawn therebetween to urge said skirt-like member into sealing engagement with the sides of the units forming a tier but not so large as to permit said skirt-like member to be drawn onto the tops of the units forming a tier, said top member having an aperture for communication with a source of suction thereby to create a desired suction within said head whereby said skirt-like member engages said units in said substantially air-tight manner.

3. In apparatus for transferring a plurality of units in groups formed of individual units in patterned relation forming a tier, having an open space in the interior thereof, a hollow suction head for gripping and transferring a tier comprising a hollow rigid upper portion having a solid top member and a spacing member affixed to and depending from said top member and having openings therein for the free passage of air therethrough, a substantially air-impermeable, flexible skirt-like member affixed to said upper portion in substantially air-tight manner and depending from said upper portion adjacent to the periphery thereof and adapted to encircle the units forming a tier and to engage in substantially air-tight manner the sides of the units forming the periphery of a tier, a plurality of resilient pads affixed to and depending from said upper portion inwardly of said skirt-like member and extending in a line outlining the peripheral edge of a tier of units, said pads being spaced from each other and being adapted to engage the upper surfaces of the units forming a tier adjacent the peripheral edge of the tier, a further resilient pad affixed to and depending from said upper portion and located so as to seal said open space when said head is in contact with a tier, said top member having an aperture for communication with a source of suction thereby to create a desired suction within said head whereby said skirt-like member engages said units in said substantially air-tight manner.

4. In apparatus for transferring a plurality of units in groups formed of individual units in patterned relation forming a tier having an open space in the interior thereof, a hollow suction head for gripping and transferring a tier comprising a hollow rigid upper portion having a solid top member and a spacing member affixed to and depending from said top member and having openings therein for the free passage of air therethrough, a substantially air-impermeable, flexible skirt-like member affixed to said upper portion in substantially air-tight manner and depending from said upper portion adjacent to the periphery thereof and adapted to encircle the units forming a tier and to engage in substantially air-tight manner the sides of the units forming the periphery of a tier, and a resilient pad affixed to and depending from said upper portion and located so as to seal said open space when said head is in contact with a tier, said top member having an aperture for communication with a source of suction thereby to create a desired suction within said head whereby said skirt-like member engages said units in said substantially air-tight manner.

5. In apparatus for transferring a plurality of units in groups formed of individual units in patterned relation forming a tier having an open space in the interior thereof, a hollow suction head for gripping and transferring a tier comprising a hollow rigid upper portion having a solid top member and a spacing member affixed to and depending from said top member and having openings therein for the free passage of air therethrough, a substantially air-impermeable, flexible skirt-like member affixed to said upper portion in substantially air-tight manner and depending from said upper portion adjacent to the periphery thereof and adapted to encircle the units forming a tier and to engage in substantially air-tight manner the sides of the units forming the periphery of a tier, and a resilient pad affixed to and depending from said spacing member and located so as to seal said open space when said head is in contact with a tier, said pad having a highly resilient upper portion and a substantially air-tight lower portion, said top member having an aperture for communication with a source of suction thereby to create a desired suction within said head whereby said skirt-like member engages said units in said substantially air-tight manner.

References Cited in the file of this patent
UNITED STATES PATENTS

| | | |
|---|---|---|
| 1,514,036 | Debaecker | Nov. 4, 1924 |
| 2,716,497 | Wahl et al. | Aug. 30, 1955 |